United States Patent
Iverson

(10) Patent No.: US 7,914,046 B2
(45) Date of Patent: Mar. 29, 2011

(54) VEHICLE MUD FLAP WITH WHEEL LINER ATTACHMENT TAB

(75) Inventor: David Iverson, Chicago, IL (US)

(73) Assignee: MacNeil IP LLC, Bolingbrook, IL (US)

( * ) Notice: Subject to any disclaimer, the term of this patent is extended or adjusted under 35 U.S.C. 154(b) by 478 days.

(21) Appl. No.: 12/051,721

(22) Filed: Mar. 19, 2008

(65) Prior Publication Data

US 2009/0236814 A1    Sep. 24, 2009

(51) Int. Cl.
*B62D 25/18* (2006.01)
(52) U.S. Cl. .... 280/848; 280/851; 172/508; 292/DIG. 1
(58) Field of Classification Search .................. 280/847, 280/152.05, 152.1, 152.3, 154, 848, 851, 280/852; 172/508, 509, 517; 292/DIG. 1
See application file for complete search history.

(56) References Cited

U.S. PATENT DOCUMENTS

| | | | |
|---|---|---|---|
| 1,513,167 A | 10/1924 | Fleming | |
| 1,809,711 A * | 6/1931 | Kile | 280/851 |
| 2,077,818 A * | 4/1937 | Zaiger | 280/851 |
| 2,365,792 A * | 12/1944 | Wohlfield | 280/850 |
| 2,761,698 A * | 9/1956 | Schatzman | 280/848 |
| 2,826,428 A | 3/1958 | Lincoln | |
| 3,953,053 A | 4/1976 | Arenhold | |
| 4,323,262 A | 4/1982 | Arenhold | |
| 4,605,238 A | 8/1986 | Arenhold | |
| 4,688,814 A | 8/1987 | Arenhold | |
| 4,709,938 A * | 12/1987 | Ward et al. | 280/851 |
| 4,733,879 A | 3/1988 | Arenhold | |
| 5,048,868 A | 9/1991 | Arenhold | |
| 5,120,082 A * | 6/1992 | Ito | 280/851 |
| 6,382,675 B1 * | 5/2002 | Furuse et al. | 280/847 |
| 6,431,605 B1 | 8/2002 | Miller et al. | |
| 6,648,373 B2 | 11/2003 | Hawes | |
| 6,919,501 B2 | 7/2005 | Burton | |
| 6,938,930 B1 * | 9/2005 | Beach | 280/851 |
| 6,971,828 B2 | 12/2005 | Bernardo | |
| 6,974,175 B2 | 12/2005 | Willey | |
| 7,537,243 B1 * | 5/2009 | Perry | 280/847 |
| 2004/0140664 A1 * | 7/2004 | Ward | 280/848 |
| 2005/0093288 A1 * | 5/2005 | Kim | 280/848 |
| 2006/0284407 A1 | 12/2006 | Iverson et al. | |

FOREIGN PATENT DOCUMENTS

DE    3532985 A1    3/1987

(Continued)

OTHER PUBLICATIONS

Search Report, The Patent Office, Application No. GB 9711746.9, Nov. 16, 1998.

(Continued)

*Primary Examiner* — J. Allen Shriver, II
*Assistant Examiner* — John R Olszewski
(74) *Attorney, Agent, or Firm* — Momkus McCluskey, LLC; Jefferson Perkins

(57) ABSTRACT

A mud flap is provided with an integrally molded upstanding tab which captures a free edge of a wheel liner or similar wheel well-forming vehicle body element. The upstanding tab may be combined with OEM screw holes or clamping members to affix the mud flap to the vehicle wheel well.

6 Claims, 15 Drawing Sheets

FOREIGN PATENT DOCUMENTS

| | | |
|---|---|---|
| DE | 4415648 C1 | 7/1995 |
| FR | 2410591 A | 8/1979 |
| GB | 928004 A | 6/1963 |
| GB | 2045706 A1 | 11/1980 |
| GB | 2114946 A1 | 9/1983 |
| GB | 2223723 A1 | 4/1990 |
| GB | 2327401 A1 | 1/1999 |
| JP | 4244488 A1 | 9/1992 |
| JP | 04254267 A * | 9/1992 |
| JP | 04300789 A * | 10/1992 |
| JP | 06032253 A * | 2/1994 |

OTHER PUBLICATIONS

British Patent Office, Combined Search and Examibation Report of GB Application No. GB0718453.4, dated Jan. 23, 2008.

* cited by examiner

US 7,914,046 B2

VEHICLE MUD FLAP WITH WHEEL LINER ATTACHMENT TAB

BACKGROUND OF THE INVENTION

Conventional motor vehicles have tires partly recessed in wheel wells. Of course the tire extends below, and often far below, the bottom body panel of the vehicle. As it rotates on a surface each wheel (particularly if it is a drive wheel) will have a tendency to kick up tar, water, mud, stones and debris onto the vehicle body panel or rearwardly into the path of traffic behind the vehicle.

To mitigate this problem, mud flaps have been devised which attach to the rear of each wheel well and which extend downward toward the road surface, intercepting much of the matter spinning off of the wheel. Many of these mud flaps have been designed for the automotive aftermarket, in which a vehicle owner will attach the mud flap to the wheel well himself or herself. Prior automotive mud flaps have required further holes to be drilled into the flange called a "fender fold" or lip, which is an extension of the vehicle body panel that skirts the wheel well and which commonly is fabricated of sheet steel. While the use of through-fasteners through such holes usually will assure firm affixation of the mud flap to the vehicle, drilling the holes creates a serious corrosion problem and may void the OEM corrosion warranty.

Many prior attempts to affix mud flaps to vehicles without drilling such holes have been less than satisfactory. A need therefore persists for methods and fasteners for firmly affixing mud flaps to vehicle wheel wells without creating a corrosion problem.

SUMMARY OF THE INVENTION

According to one aspect of the invention, there is provided a mud flap for attachment to a vehicle wheel well. The body of the mud flap has a front face that generally faces in the direction of vehicle travel and a general rear face which is adapted to be positioned forwardly adjacent a rear surface of the wheel well. A tab, which preferably is integrally molded with the mud flap body, has a forward surface which is substantially parallel to and rearwardly displaced from the general rear face of the mud flap body. The forward surface of the tab and the general rear face of the mud flap body define therebetween a channel for receiving a downwardly depending free edge of a wheel well-forming vehicle body component, such as a wheel liner, capturing it and thereby providing a point of affixation of the mud flap to the vehicle. At least one sidewall attaches the tab to the mud flap body.

In a preferred embodiment, the attaching sidewall is formed by a substantially horizontal shelf which in turn is a continuation of a surface which conforms to an exterior surface of the vehicle body exterior. The tab is positioned sufficiently inboard on the mud flap body to be inboard of the inboard end of a body fender fold.

In one embodiment of the invention, the mud flap also includes at least one fastener, spaced from the tab, to affix the mud flap body to the fender fold at another affixation point along the fender fold. While fasteners of various sorts can be used, such as one employing sliding clamps, a preferred fastener includes a central bolt or screw, on which is threadedly carried a rotating clamping member. A clamping arm of the rotating clamping member extends radially outwardly from an axis of the bolt or screw. The bolt or screw is inserted through a through-hole in the mud flap body. Screw holes aligned with OEM fastener locations may alternatively be provided.

The present invention thus provides a secure method of affixing a mud flap to a vehicle wheel well without drilling further holes, and without requiring the end user to manipulate a fastener component on the relatively inaccessible, rearward side of the fender fold or back side of the mud flap body to be attached.

BRIEF DESCRIPTION OF THE DRAWINGS

Further aspects of the invention and their advantages can be discerned in the following detailed description, in which like characters denote like parts and in which.

DETAILED DESCRIPTION

Figure 1:
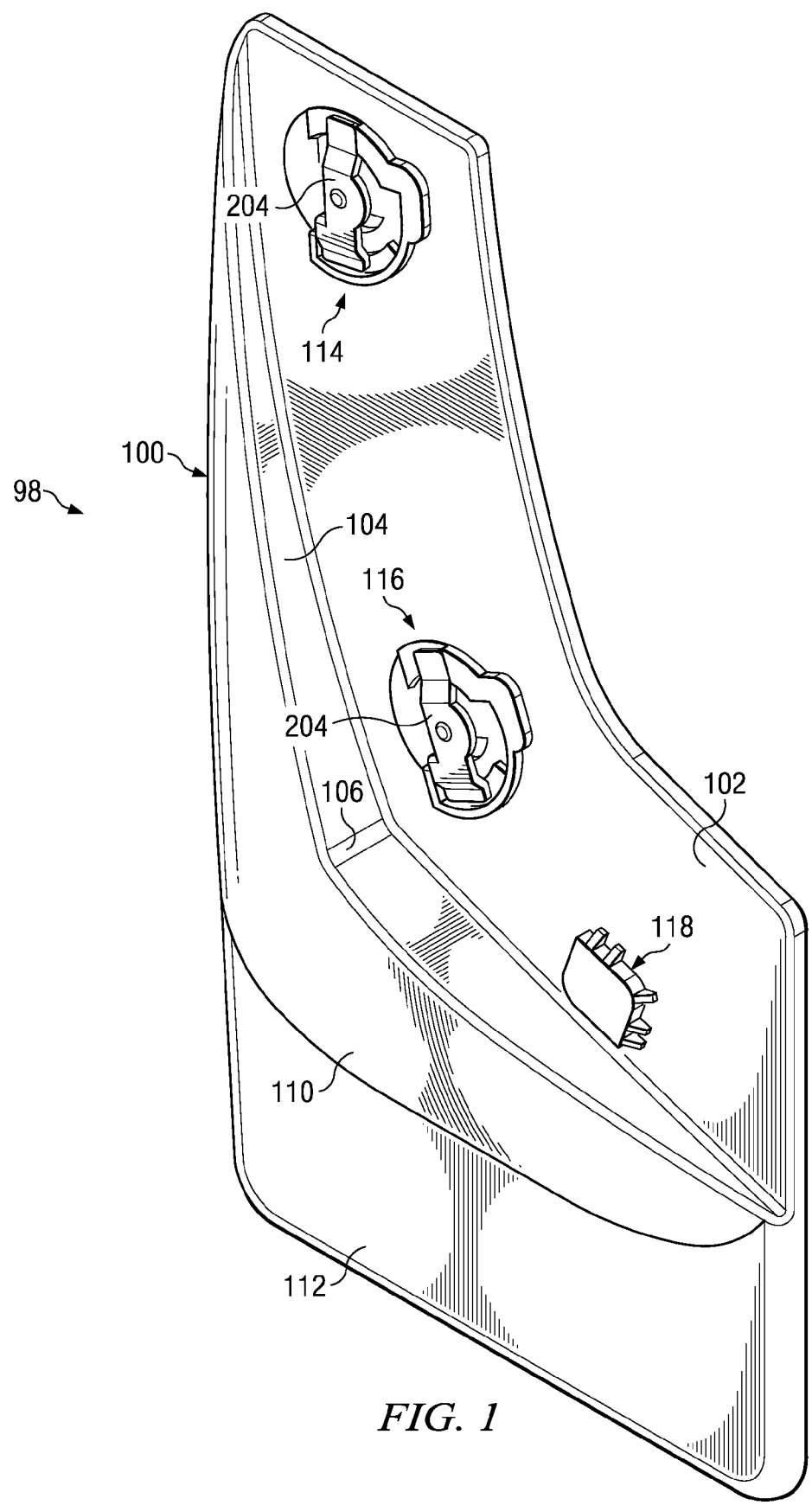
FIG. 1 is an isometric view of a mud flap according to the invention, shown prior to installation on a vehicle and from a rear direction.
Figure 2:
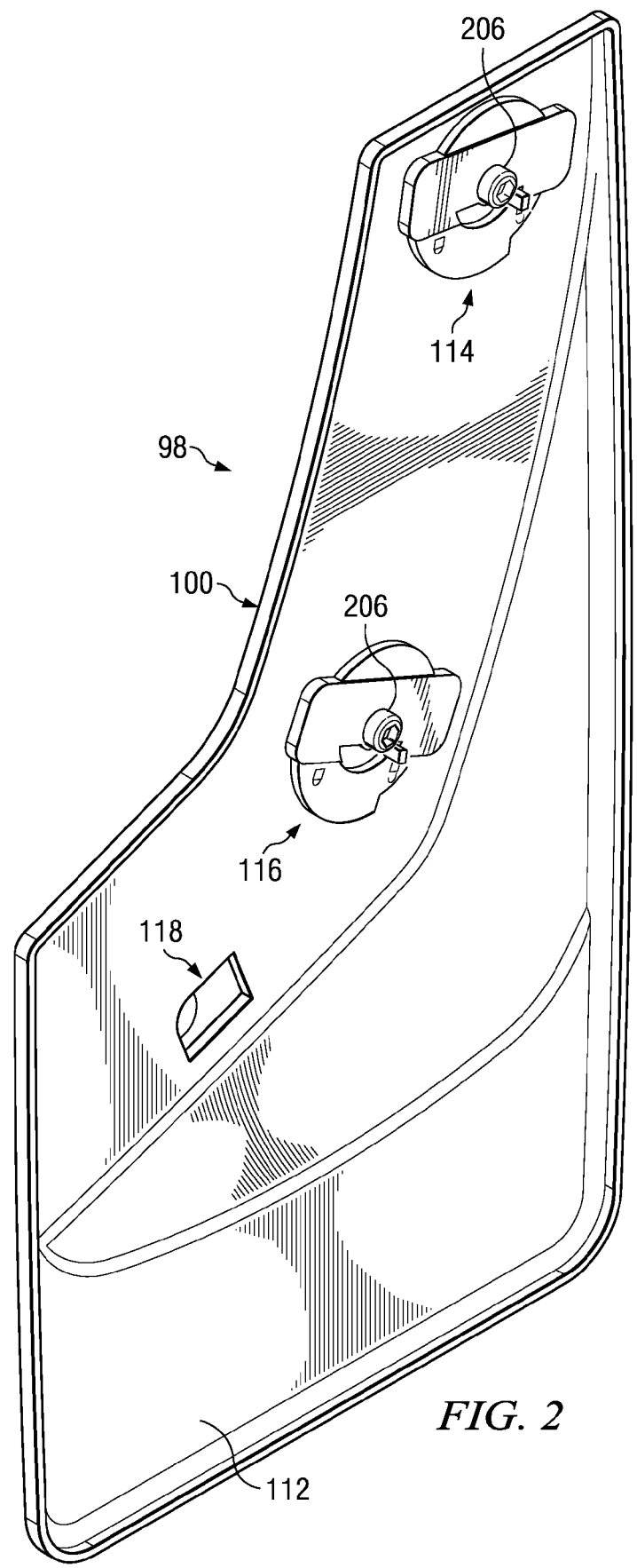
FIG. 2 is an isometric front view of the mud flap shown in FIG. 1.
Figure 3:
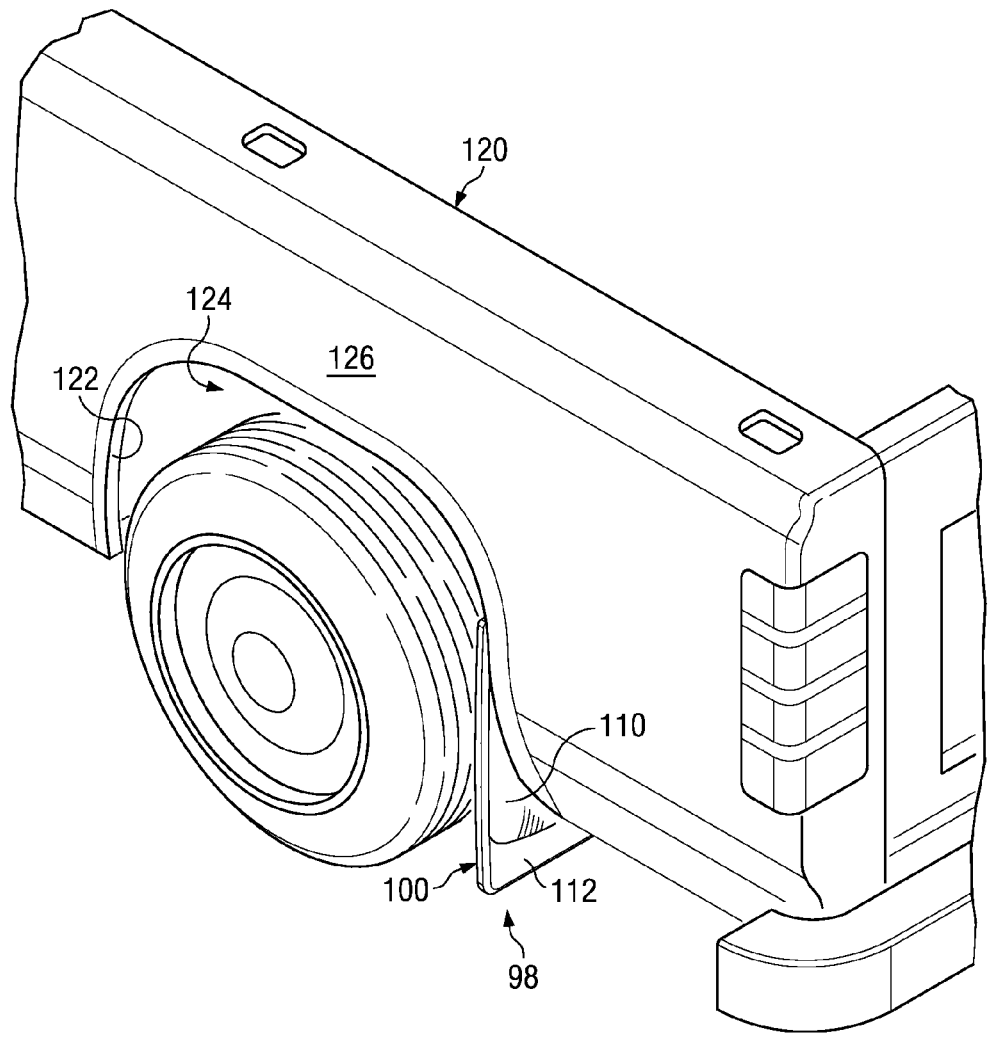
FIG. 3 is an isometric view of the mud flap of FIGS. 1 and 2, shown installed on a vehicle, and from a rear and outboard direction.

FIG. 1 shows a rear view of a mud flap 98 according to the invention and prior to installation, and FIG. 2 is a front view of this uninstalled mud flap. A body 100 of the mud flap 98 is preferably integrally molded from a suitable plastic or rubber polymer. Referring particularly to FIG. 1, the body 100 has a general rear surface 102 which is meant to conform to an interior rear portion of a vehicle wheel well. The pictured mud flap 98 is meant to be fitted to a left rear wheel well of a vehicle 120, as is shown in FIG. 3. As seen in FIG. 1, from the general rear face 102, there rearwardly extends a ledge 104 that, in use, conforms to the exterior body panel of the vehicle. This body panel, and therefore ledge 104, typically will slant in a downward and inboard direction and in many cases will have a corner 106, as shown. From the ledge 104, the mud flap body 100 continues downward, in the illustrated embodiment taking a convex shape 110 as seen from the rear. A terminal panel 112 may extend downwardly from the convex portion 110.

In this illustrated embodiment, the mud flap 98 has three devices to affix it to a vehicle wheel well fender fold: two fasteners 114 and 116, and a tab 118. Fasteners 114 and 116 and tab 118 are preferably well spaced apart from each other to provide three spaced-part affixation points, and also preferably so distributed so as not to be colinear. The tab 118 can also be used with other sorts of fasteners, such as simple screws, bolts or push-fasteners for receipt into OEM-drilled holes in the fender fold, or kinds of clamps other than those illustrated herein. The illustrated embodiment is furnished for a wheel well fender fold which has no predrilled holes at all. In alternative embodiments, only one additional fastener apart from tab 118 may be needed.

Figure 4:
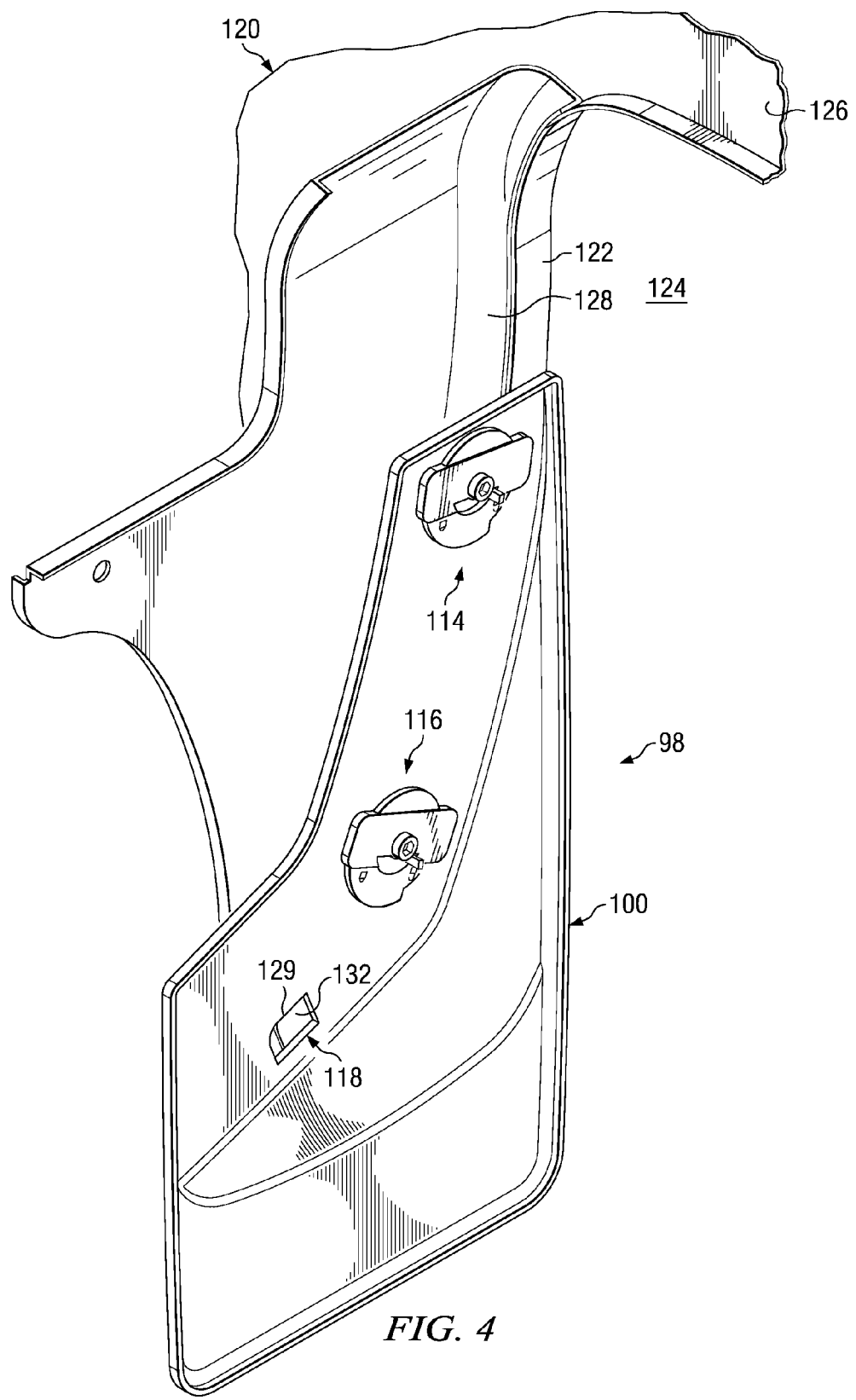
FIG. 4 is an isometric view of the mud flap of FIGS. 1-3, shown from a forward and inboard direction in combination with certain body panels of a vehicle onto which it had been installed.

FIGS. 3 and 4 show the mud flap 98 as affixed to the rear portion of a wheel well of a vehicle 120. In the illustrated embodiment, a fender fold 122 bounds the entirety of the wheel well 124 at its juncture with a body panel 126. In addition, this wheel well is composed in part by a separate inner fender 128 which is welded to the body panel 126. Therefore, at least portions of the fender fold 122 are composed of two thicknesses or laminations of sheet steel or other material making up the vehicle body, and the tab 118 must be designed to fit over the ends of both laminations, as will be described below. In other embodiments, only one thickness or lamination of sheet steel or other body panel material makes up the fender fold and for these embodiments the channel formed by the tab 118 and the rear face 102 may be commensurately narrower.

Near tab 118, preferably a window 129 is left in the mud flap body 100. When the mud flap 98 has been correctly assembled to the vehicle fender fold 122, an end 132 of the fender fold (actually in the illustrated embodiment an end of one of the fender fold laminations, as will be explained below) will be visible to the consumer/installer from the front face of the mud flap body 100. This window 129 is also preferred because it aids in injection-molding the mud flap 98 without requiring a side action in the mold.

Figure 5:
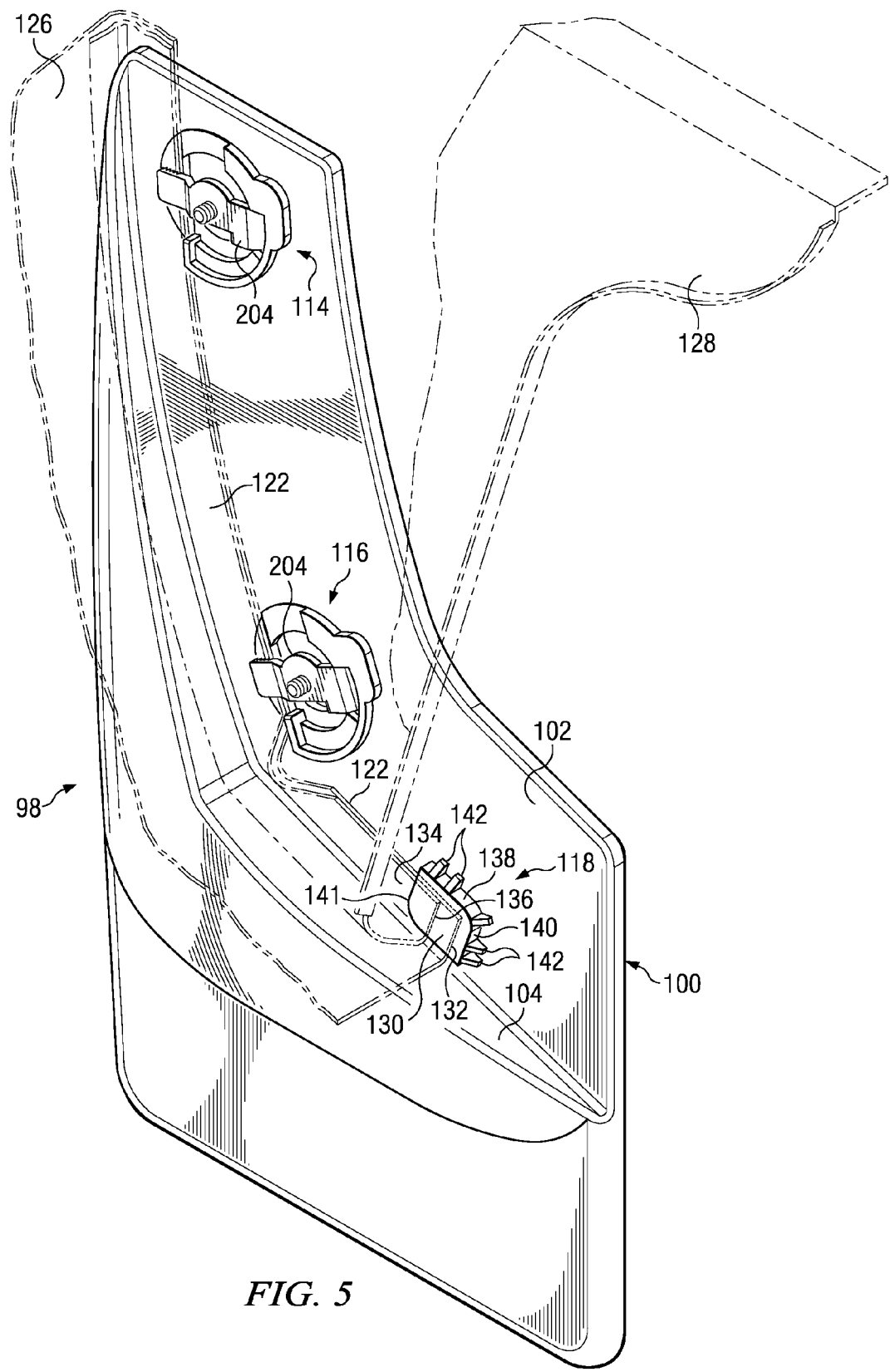
FIG. 5 is a detail showing the relationship of the mud flap tab and fasteners to a vehicle fender fold, the automotive body panels terminating in the fender fold being shown in phantom.

FIG. 5 is a detail of the mud flap 98, with the vehicle body panels 126, 128 onto which the mud flap 98 has been installed being shown in phantom. The tab 118 is disposed upward of the ledge 104. In the illustrated vehicle, the fender fold 122 is made up of the ends of two body panels 126 and 128. At the wheel well, a rear quarter panel 126 terminates in a forward direction in a fender fold lamination 130 that has a fender fold end 132. The body panel 126 also curves in an inboard direction from a vertical plane to almost a horizontal one. In the illustrated vehicle model, an inner fender wall 128 starts as a substantially vertical piece, but near its lower end it is curved forwardly toward the horizontal and then sharply upwardly to form a fender fold lamination 134. The fender fold lamination 134 has an end 136 which, in this embodiment, is not completely aligned with the end 132 of the fender fold lamination 130. The tab 118 should be so constructed as to fit over and "capture" both ends 132 and 136.

The tab 118 is preferably integrally molded with the rest of the mud flap body 100 and, for ease of molding, is approximately of the same thickness. The tab 118 is preferably joined to the rest of the mud flap body 100 by an upper sidewall 138, an inner surface of which is disposed above an upper margin of the taller of fender fold laminations 130, 134 (here, they are about the same height), and an inboard sidewall 140, an outboard surface of which is displaced by a predetermined amount from the inboardmost one of fender fold component ends 132, 136. It is also preferred that a certain amount of tolerance be built into the fit of the fender fold upper margins to the upper tab sidewall 138, and into the fit of the fender fold lamination ends 132, 136 to the inboard sidewall 140, to take manufacturing variations into account and to ease assembly by the consumer. To this same end, a free margin 141 of the tab 118 is preferably curved so as to more easily permit the insertion of the fender fold ends 132, 136 into the pocket created by tab 118, rear face 102 and sidewalls 138 and 140.

Preferably, an inner surface of sidewall 138 and ledge 104 are substantially parallel to each other and at a distance apart which is preselected to be slightly larger than the height of the fender fold 122. This "cages" the fender fold 122 between these two parallel surfaces, preventing upward or downward movement. A combination of upper sidewall 138, end sidewall 140 and ledge 104 still permit the mud flap 98 to be slid into place in an upper and outboard direction along the fender fold 122 (upward and to the left in FIG. 5), until the fender fold lamination ends 132, 136 are captured by the interaction of tab 118, rear face 102, sidewall 138, ledge 104 and sidewall 140.

Also seen in FIG. 5 is a plurality of reinforcing gussets 142 that preferably are integrally molded with the rest of the mud flap body 100. Each gusset 142 is preferably formed at an angle, and even more preferably a right angle, to the tab 118, to the sidewall 138 or 140 to which the gusset is attached, and to the general rear face 102. Gussets 142 preferably are triangular in shape and extend from the rearwardmost surface of tab 118 to the general rear mud flap body face 102. The gussets 142 are formed to extend from the upper and inboard sides of tab 118 so as not to interfere with the insertion of the fender fold 122.

Figure 6:
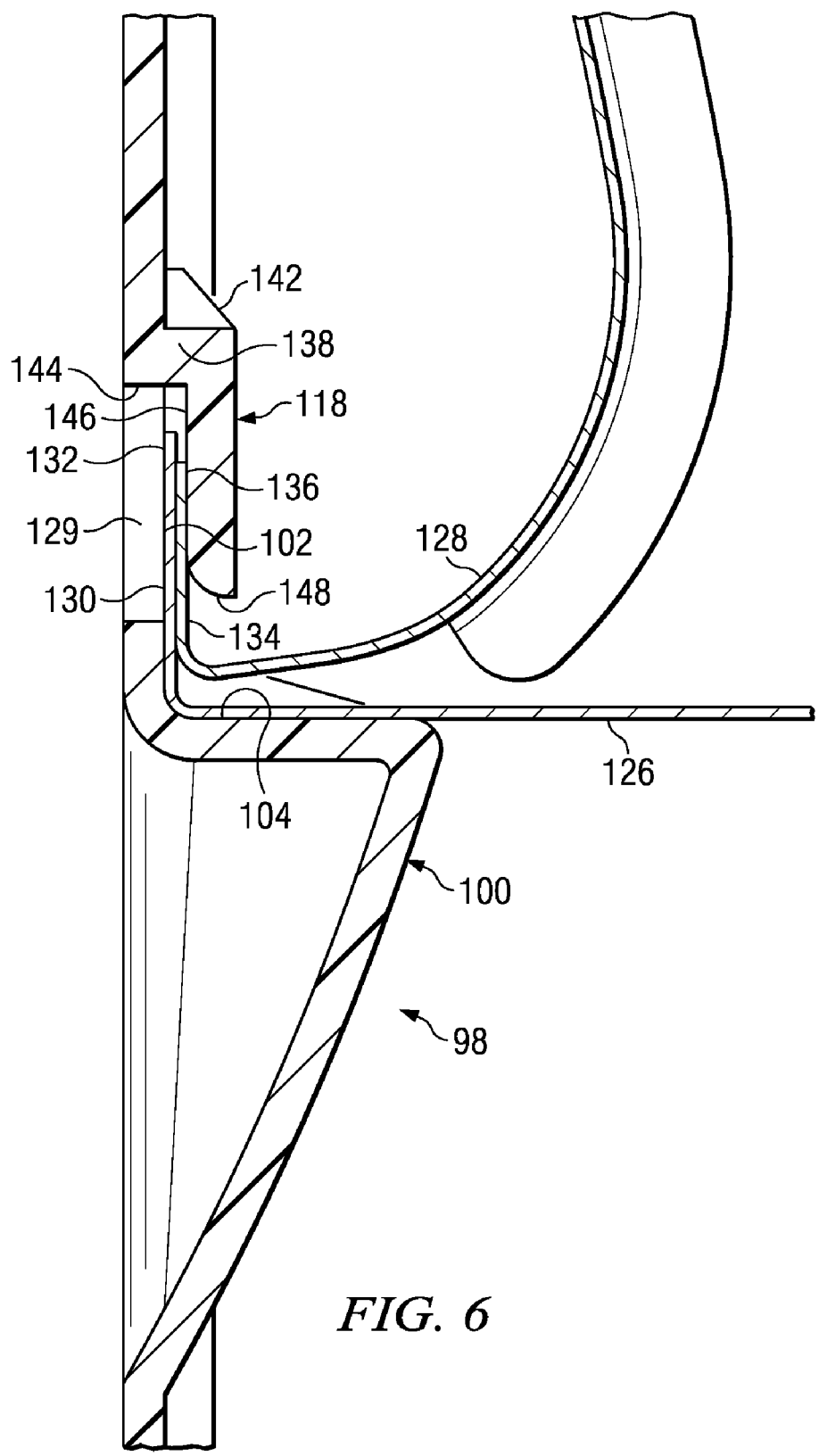
FIG. 6 is a cross-sectional detail taken through a tab and adjacent mud flap body and fender fold.
Figure 7:
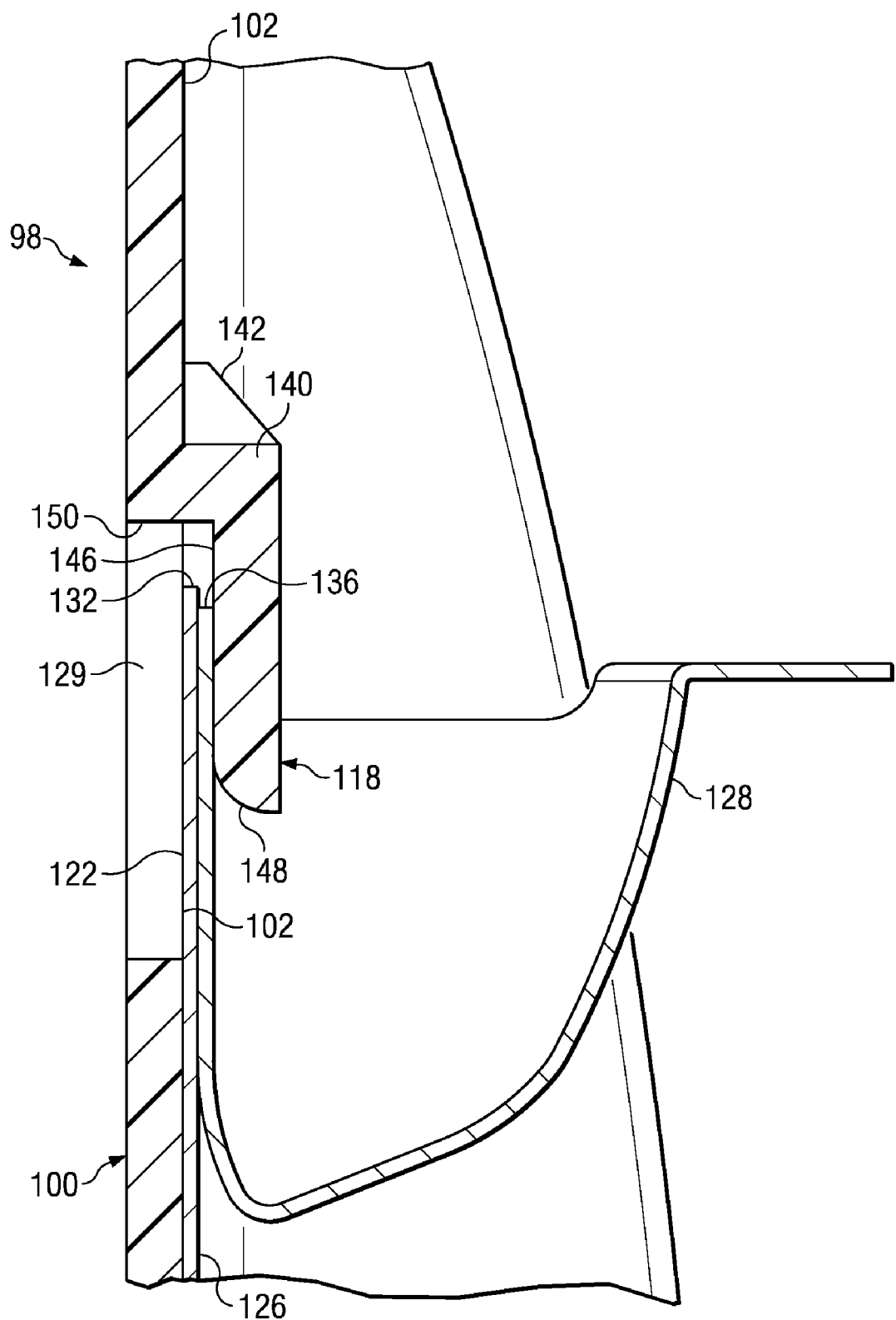
FIG. 7 is a cross-sectional detail taken at about ninety degrees from the cross-section shown in FIG. 6.

FIGS. 6 and 7 are sectional details taken through the mud flap 98 in the area surrounding tab 118. FIG. 6 is a cross section taken in a plane which is substantially vertical and parallel to the direction of vehicle travel while FIG. 7 shows a horizontal cross section substantially at right angles to the section shown in FIG. 6. Referring to FIG. 6, an inner or lower surface 144 of the upper sidewall 138 is positioned to be above the upper limit of fender fold lamination 130. Surface 144 is also preferably substantially parallel to ledge 104. The distance between surfaces 144, 104 is chosen to be somewhat greater than a height of the taller of the fender fold laminations 130, 134 to ease installation and accommodate variation in vehicle panel manufacture.

A front surface 146 of the tab 118 is positioned rearwardly (in FIG. 6, to the right) from the general rear face 102 by enough of a distance that the fender fold 122 (in the illustrated embodiment, made up by two laminations 130, 134) can be slid therebetween. To further aid installation, it is preferred that an end 148 of the front tab surface 146 be rearwardly curved, as shown.

As best seen in FIG. 7, an inboard surface 150 of end sidewall 140 is positioned to be well outboard (upward in FIG. 7) of the predicted position of fender fold lamination ends 132, 136. This eases installation and accommodates some variation in the formation and joining together of the vehicle panels. It can be seen that free tab surface end 148 is rearwardly curved in the plane of this section also, once again to promote easy registration of the fender fold 122 into the slot or channel created by the tab 118 and the general mud flap body rear face 102.

While the tab 118 can be used in combination with any other mud flap fastener including fasteners meant to be received in holes in the fender fold 122, the use of one or more clamping fasteners is preferred at least in those instances where the vehicle manufacturer has not predrilled such holes. A particularly preferred clamping fastener 116 will be described in more detail below; it is preferred that fastener 114 be similar. The fastener 116 is so constructed that the consumer may conveniently, yet securely, install the mud flap 98 without getting underneath the vehicle, and without, in at least some circumstances, obtaining physical access to the rear side of the fender fold 122.

Figure 8:
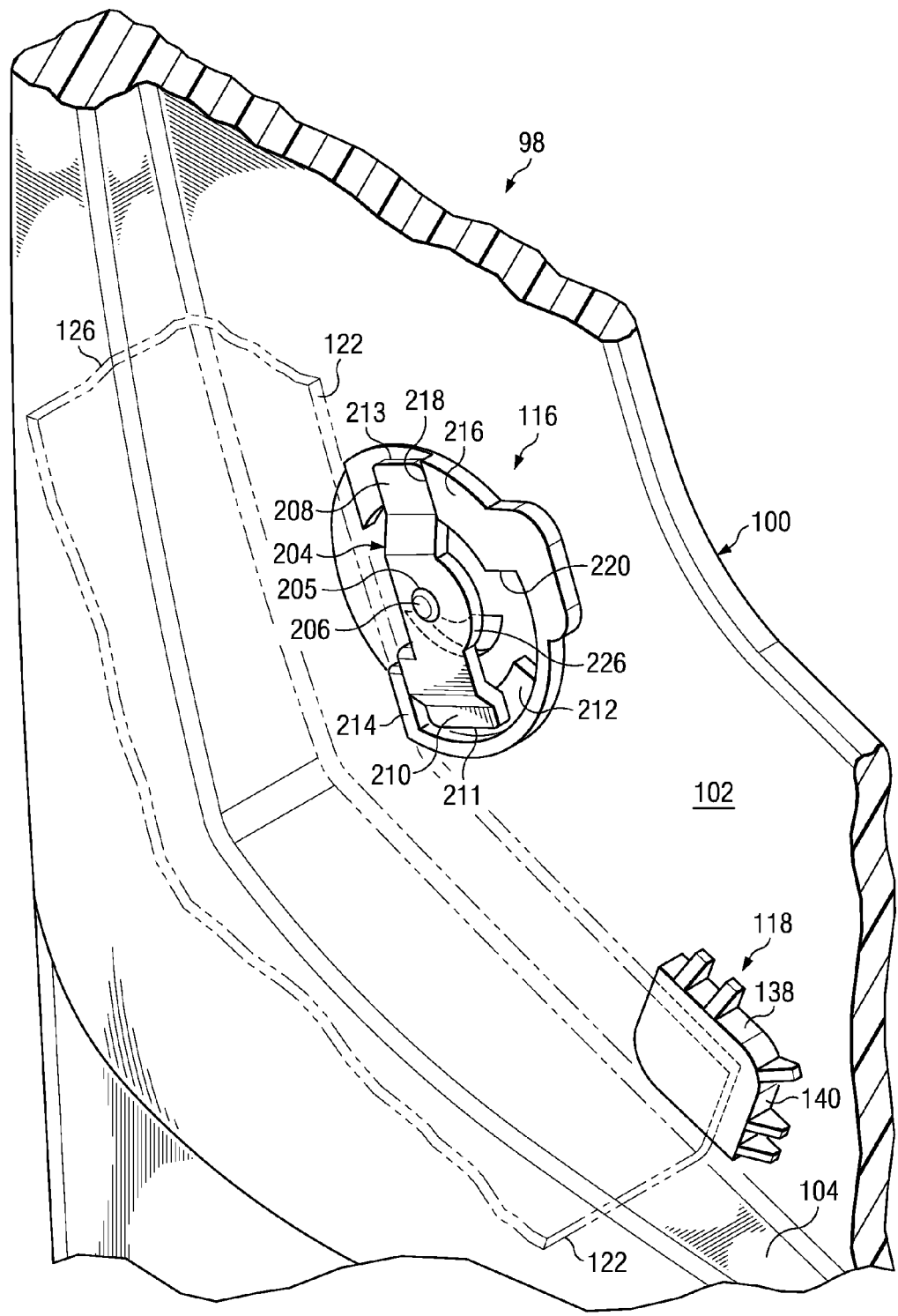
FIG. 8 is a detail of a mud flap according to the invention, taken from a rearward and inboard direction, showing a rotating member of a preferred mud flap fastener in a first, disengaged position.
Figure 9:
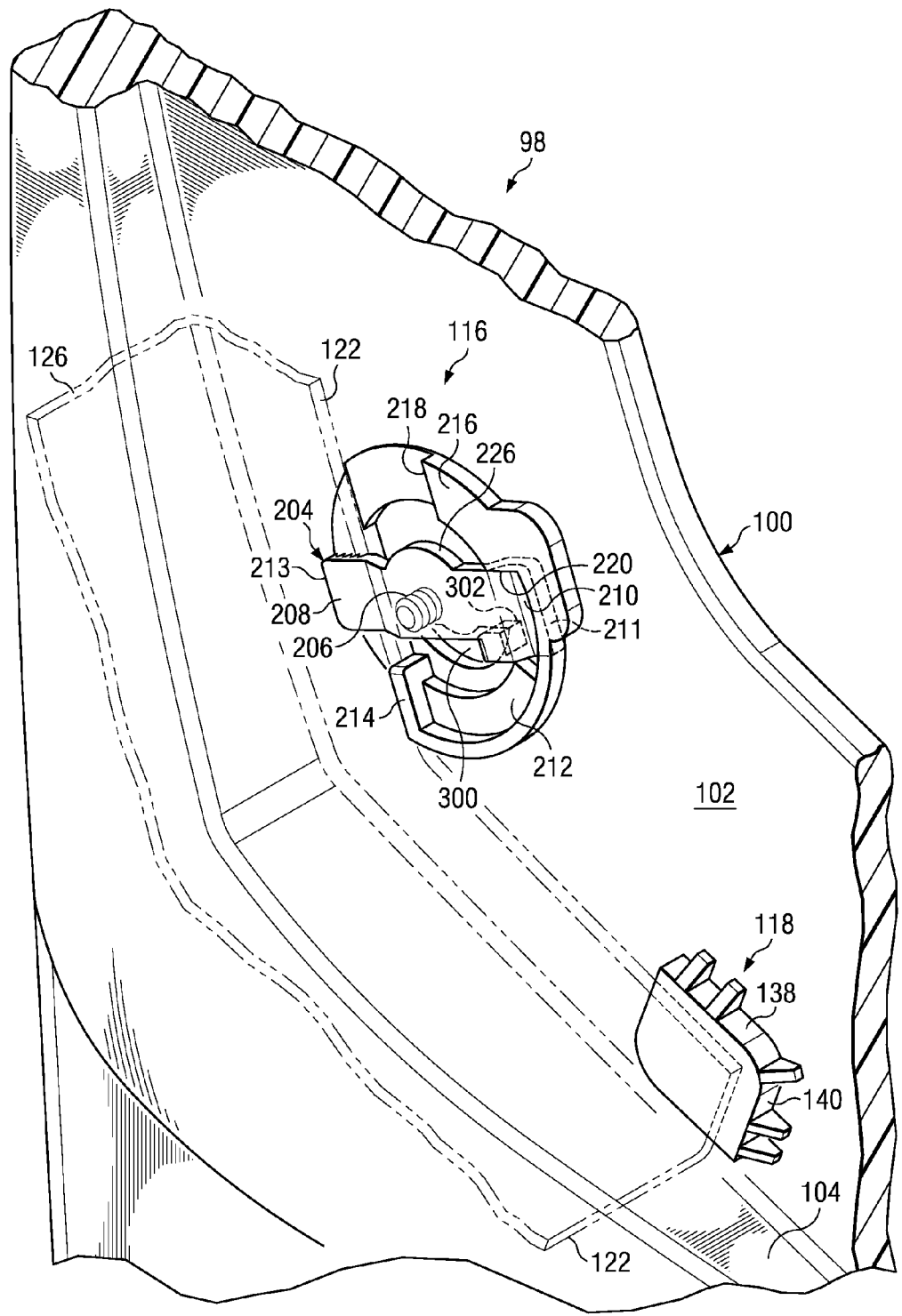
FIG. 9 is a view similar to that shown in FIG. 8, but after the rotating member has been rotated to a second, engaged position.

FIGS. 8 and 9 show a mud flap 98 in the process of being installed in a wheel well of a vehicle. The view of these FIGURES is from a rearward and inboard direction. The body panel 126, and the panel-terminating fender fold 122, are shown in phantom in FIGS. 8 and 9. In the embodiment shown in FIGS. 8 and 9, the fender fold 122 is formed of only a single lamination. In the illustrated embodiment, at the location where fastener 116 engages it, the fender fold 122 will stand substantially vertically or at a steep angle from the horizontal, and in a plane transverse to the direction of travel of the vehicle. But the fastener 116 of the present invention may be used to clamp the mud flap 98 to other locations along the fender fold 122, such as a location higher up in the wheel well, and as shown more than one fastener 114, 116 may be used to secure a single mud flap 98 to the vehicle.

FIG. 8 shows a rotating member 204 of the fastener 116 having a threaded center hole 205 threaded onto a central bolt or screw 206. The bolt 206 is rotatable by a consumer or installer from the opposed, front surface of the mud flap 98 (see FIG. 4) and extends through a nonthreaded bolt hole in the mud flap 98. The rotating member 204 has a clamping arm 208 which radially extends from the axis of bolt 206, and, angularly separated from it, a stop arm 210 which also radially extends from the axis of bolt 206. Preferably the stop arm 210 and the clamping arm 208 are angularly separated by about 180 degrees. The stop arm 210 has a frontwardly offset stop end 211. The clamping arm 208 similarly has a frontwardly offset clamping end 213.

The general rear face 102 of the mud flap 98 has a preferably arcuate shelf or rest 212 which protrudes rearwardly from the general plane of the rear surface 102 by a height which is typically chosen to be greater than the thickness of the fender fold 122. For ease in manufacture, the rest 212 can be molded as indentation of an otherwise generally flat and generally uniformly thick mud flap 98. The rest 212 is positioned to be underneath (forward of) the stop end 211 through a predetermined arc of travel of the stop arm 210. This arc is preferably chosen to extend from a first unengaged position of the stop arm 210 (shown in FIG. 2) to a position at which the stop end 211 will be disposed when the clamping end 213 begins to slide behind the fender fold 122. The purpose of the rest 212 is to prevent frontward movement of the rotating clamping member 204 relative to the bolt 206 and the fender fold 110 until the clamping arm has begun to slide behind the fender fold 122. At a first end of the shelf 212 is a rearwardly projecting lug 214 which acts as a stop to prohibit (in this FIGURE) clockwise rotation of the stop arm 210 and also acts as an abutment surface against which the fender fold 122 can be fitted.

Another rearward projection from the general planar rear surface 102 of the mud flap 112 is a stop 216. Like shelf or rest 212, stop 216 can be molded as an indentation into a region of the mud flap 112 that otherwise has a substantially uniform thickness. The stop 216 may be formed as an arc around the axis of bolt 206, but in any event has two angularly spaced, rearwardly projecting surfaces that are parallel to the axis of bolt 206: a clamping end stop surface 218 against which the clamping end 213 will abut while the rotating clamping member 204 is in the first position, as shown in FIG. 8, and a stop end stop surface 220 against which the stop end 211 will abut while the rotating clamping member is in a second position, as shown in FIG. 9. The surfaces 218 and 220 are deep enough that they will intersect the arcs of travel of the respective clamping and stop ends 213, 211.

In the embodiment shown in FIGS. 8 and 9, the right end of the rest 212 and the stop surface 220 are spaced apart by a surface which is substantially coplanar with the general rear mud flap surface 102. Such an open region could be provided in order to account for variations in the thickness of fender fold 122 and in any attached primer, filler and paint, which can vary from one specific vehicle to the next, even within the same vehicle model. Permitting the stop end 211 to slip frontwardly of the rest 212 allows the opposed clamping end 213 to tilt rearwardly, better assuring that the clamping end 213 will slide behind the fender fold 122 as intended.

In an alternative embodiment, the right end of the rest 212 and the stop surface 220 are spaced apart by a shallow arcuate shelf (not shown) which is typically chosen to be about as thick as the thickness of the fender fold 122. This shelf would receive stop arm end 211 when the rotating clamping member 204 is completely behind the fender fold 122, as is seen in FIG. 9.

Also as seen in FIG. 9, an arcuate slot 300 is formed through the mud flap 98 to be concentric of the bolt 206. A finger 302 of the rotating clamping member 204 is bent or otherwise formed to extend frontwardly (in this FIGURE, to the right) in a direction substantially parallel to the bolt or screw axis. The arcuate slot 300 is sized to receive this finger 302. The finger 302 will be visible from the front side of the mud flap 98 and indicates the position of the rotating member 204 relative to the fender fold 122.

As provided to the consumer, the rotating member 204 should take the position shown in FIG. 8 and should not rotate freely and independently of the bolt 206. There needs to be some resistance to the threaded rotation of the member 204 on bolt 206. This can be provided, for example, by coating the end of the threads on bolt 206, or distorting the thread pattern on the end of the bolt to make threaded rotation of the member 204 relative to bolt 206 more difficult, or by distorting the female threads in the central hole 205 formed in the rotating member 204. This resistance to threaded or helical movement permits the clamping end 213 of the rotating member 204 to slide behind the fender fold 122, in a position that is most rearward on the bolt 206. Otherwise, there is an enhanced danger that the rotating clamping member 204 will start being drawn forwardly on threaded bolt 206 even before its clamping end has slid behind the fender fold 122.

The presence of a bolt-receiving hole 205 in the middle of the rotating clamping member 204 creates a structural weakness at this point; if uncompensated for, any tendency of the rotating member 204 to bow or flex when clamped to the fender fold 110 will occur preferentially in a plane including the bolt hole axis. To compensate for this weakness because of the loss of material, it is preferred to form the rotating clamping member 204 to have a central section 226 which is wider than the stop or clamping arms 208, 210 which extend to either side of it. The central enlarged portion 226 can conveniently take an arcuate shape as shown. Its radius or lateral extent should be chosen so as not to occlude the arcuate slot 300.

Figure 10A:
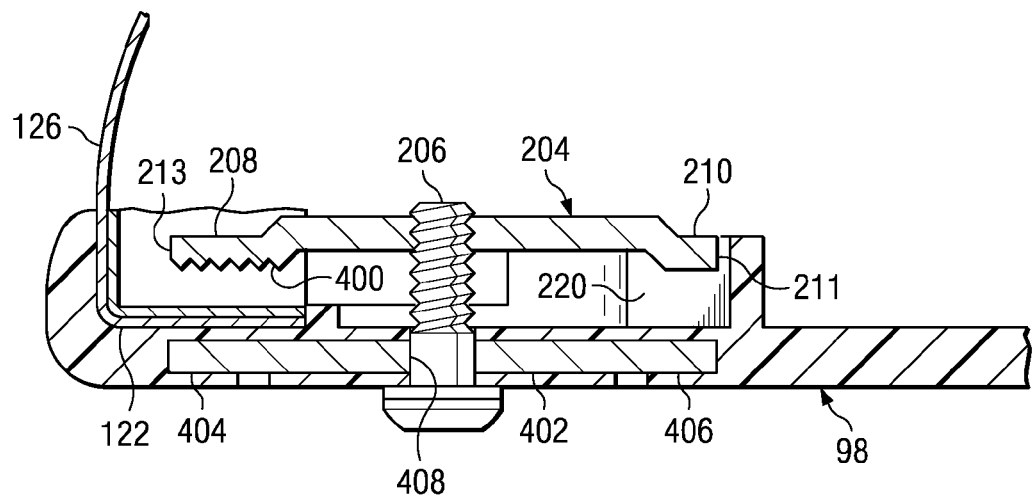
FIG. 10A is a sectional view taken through the mud flap and fender fold in a plane which includes a fastener bolt hole, showing the rotating member in the second position and prior to tightening.
Figure 10B:
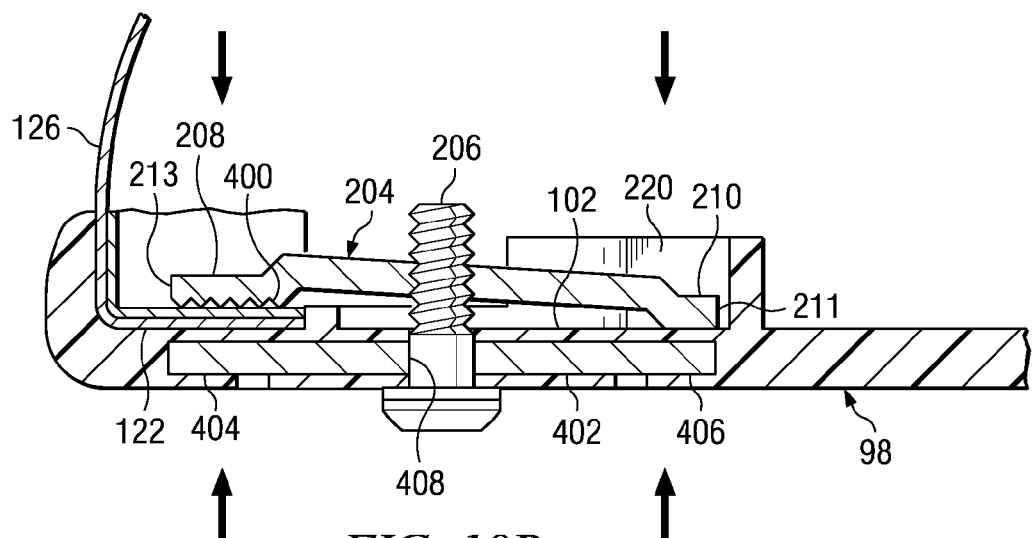
FIG. 10B is a sectional view similar to that of FIG. 10A, after the rotating member has been threadably pulled in on the fastener bolt to a third position, clamping the mud flap to the fender fold.

FIGS. 10A and 10B are sectional views taken from above through the bolt axis, wherein the rotating clamping member 204 is in the angular position seen in FIG. 9. In FIG. 10A, the rotating clamping member 204 is still residing on the free end of threaded bolt 206. Its stop arm 210 has come into contact with stop surface 220, such that further rotation of member 204 and bolt 206 as a unit will be prevented. At this point, further rotation of the bolt 206 will cause the rotating clamping member 204 to advance forwardly (in this view, downwardly) down the threads of bolt 206, until the position shown in FIG. 10B is reached. In this later position, teeth or ridges 400 formed on a forward side of the stop end 213 begin to grip the rearward (here, upward) surface of the fender fold 122, while offset end 211 begins to be supported by surface 102.

It is further preferred to provide a stationary clamping member 402 against which the rotating clamping member 204 may exert clamping force. In the illustrated embodiment, the stationary clamping member 402 is provided as an in-molded reinforcement to the otherwise rubber or other polymeric mud flap 98. In other, nonillustrated embodiments, the stationary clamping member 402 is omitted and the clamping action takes place between the mud flap body and the rotating clamping member 204. In the illustrated embodiment, the stationary clamping member 402 is preferably about as thick as the rotating clamping member 204 (such as 0.125 in.), and is preferably made of a tough and durable material such as stainless steel. The stationary clamping member should be at least coextensive in length with the clamping member 204, such that a first end 404 will be opposite the clamping end 213 of the rotating clamping member 204 when the latter has been rotated to the second position, and a second end 406 of the stationary member 402 will be opposite the stop end 211 in this position. Conveniently, the stationary member 402 and the rotating clamping member 204 can be fashioned from the same blank stamped out of sheet steel; in the instance of the rotating clamping member 204, the blank's central hole would be tapped, the ends 211, 213 offset, and the finger 302 cut and bent; in the instance of stationary member 402, a larger central hole 408 would be drilled to nonthreadedly receive the bolt 206 and a strip including 302 would be cut and removed. In other embodiments the stationary member can be rectangular.

As shown in FIG. 10B, after fully tightening the bolt 206, the stop end 211 abuts the rearward (here, upward) surface 102 of the mud flap 98. When this happens, the contact between the stop end 211 and the shelf 228 will act as a fulcrum, concentrating more clamping force between clamping end 213 and the end 404 of the stationary clamping member 402. To maximize this leverage, it is preferred that the clamping arm 208 and the stop arm 210 be angularly spaced apart by about 180 degrees.

FIGS. 10A and 10B also demonstrate the advantage of offsetting the ends 213 and 211 in a forward direction. As so offset, the end 213 will contact the fender fold 122 first, concentrating clamping force within a limited footprint. The end 211 will contact surface 102 prior to the un-offset rest of the clamping member 204 bottoming out on the mud flap 98, thereby locating the fulcrum at a maximum distance away from the fender fold 122 and maximizing clamping leverage exerted by bolt 206.

Figure 11A:
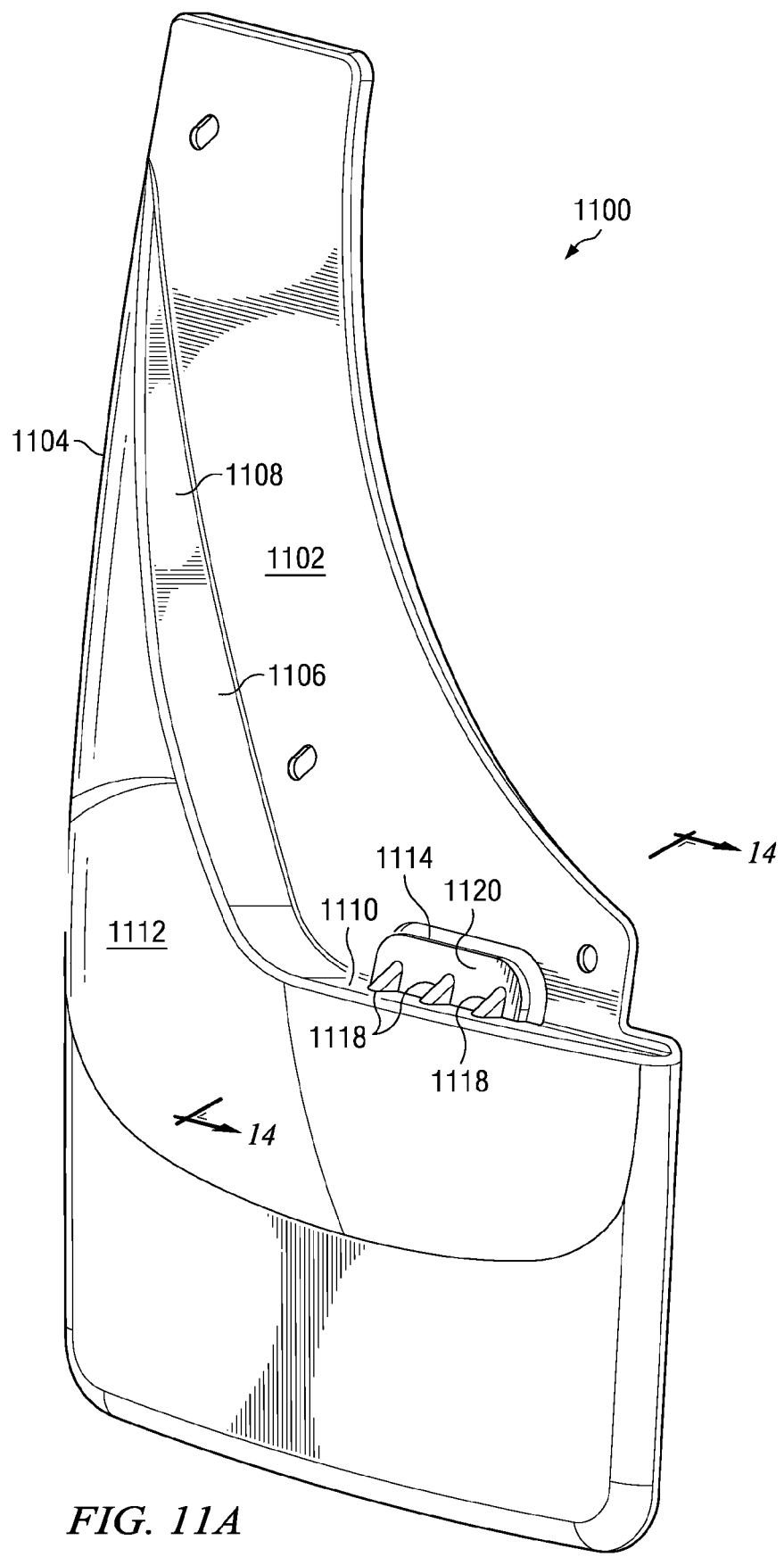
FIG. 11A is an isometric view of a further embodiment of the invention, taken from a rearward and inboard direction.
Figure 11B:
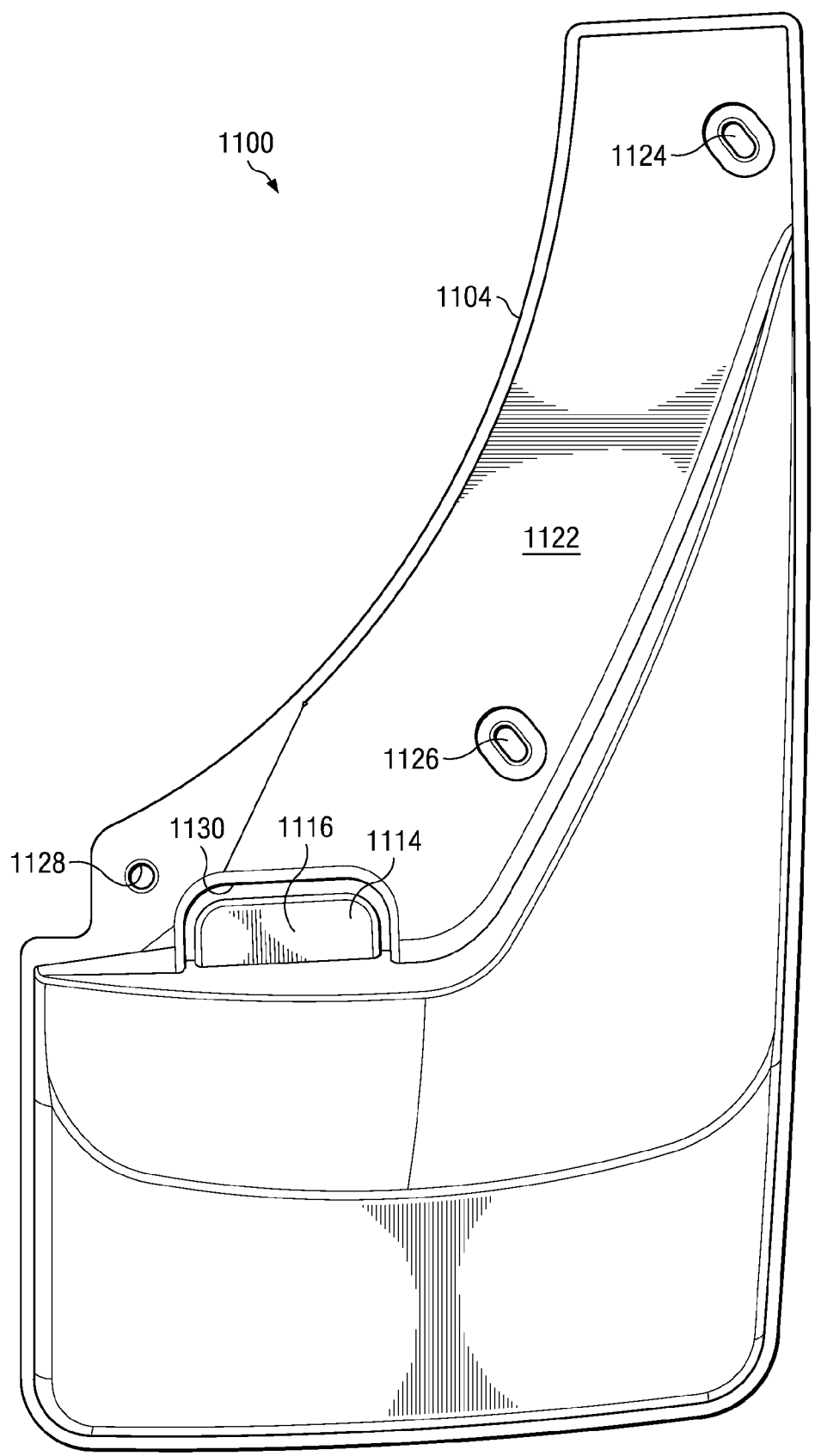
FIG. 11B is a front view of the embodiment shown in FIG. 11A, taken from a forward and lower direction.

FIGS. 11A and 11B depict yet another embodiment 1100 of the present invention, particularly adapted to affixation to a vehicle which includes a wheel well liner as well as an external body element forming a fender. FIG. 11A is a rear view that shows a general rear face 1102 of the mud flap body 1104. The general rear face stands generally transverse to the direction of vehicle travel and may be a vertical plane or, as shown, slightly convex in a Z (up and down) direction. A shelf 1106 extends rearwardly therefrom and includes an outboard portion 1108 which conforms to an external surface of a fender-forming vehicle body element 1204 (FIG. 12), and an inboard portion 1110, continuous with outboard portion 1108, which preferably is at least somewhat more horizontal in aspect. The transition between outboard portion 1108 and inboard portion 1110 can be fairly abrupt and the shape and degree of abruptness will vary greatly according to the vehicle model for which the mud flap 1100 is designed; the shelf 1106 and convexly curved body portion 1112 depending therefrom provide a way to custom-fit the mud flap 1100 to the specific model for which it is designed.

In this embodiment, the mud flap body 1104 is preferably injection-molded as a single piece out of polypropylene or other suitably tough polymer. An upstanding tab 1114 is preferably integrally molded as a portion of mud flap body 1104 to upwardly extend from the shelf portion 1110. A forward surface 1116 (see FIG. 11B) of tab 1114 is spaced rearwardly from the general rear surface 1102. To lend strength a plurality of triangularly shaped reinforcing gussets 1118 may be integrally molded with the rest of mud flap body 1104 to extend between a rear surface 1120 of the tab and the shelf portion 1110, so as to be orthogonal to the tab 1114 and shelf portion 1110.

FIG. 11B shows the front side 1122 of mud flap 1100, the side which faces the vehicle tire and which is accessible to an installer. Here can best be seen a pair of mounting bolt or screw holes 1124, 1126, here provided as slots to make sure that they line up with OEM bolt, screw or other fastener holes in the wheel liner (not shown in this FIGURE). In this illustrated embodiment, the OEM liner fasteners supplied by the vehicle manufacturer are removed and reinserted, or those liner fasteners are replaced with others of similar diameter and threading (if any) which will be accepted into the OEM fastener holes. In other embodiments, one or both the holes 1124, 1126 can be replaced with the clamping fasteners described herein. An optional bolt or screw hole 1128 is provided in the illustrated embodiment in case the installer wants this extra point of attachment.

A window 1130 is formed to extend through the body 1104 from the forward face to the rearward face thereof and to generally be in forward-rear alignment with tab 1114. This window 1130, which in the illustrated embodiment takes a shape similar to tab 1114 but is slightly wider and taller than the tab 1114, has two purposes. First, providing window 1130 obviates the necessity of providing a mold side action when injection-molding the polymer body 1104. Second, the window 11130 permits the consumer or installer to determine whether the wheel liner (not seen in this FIGURE) has been correctly seated in the channel formed by the tab 1114 and the general rear surface 1120. The rest of front face 1122 will generally conform to the topography of rear face 1120 for ease in molding.

Figure 12:
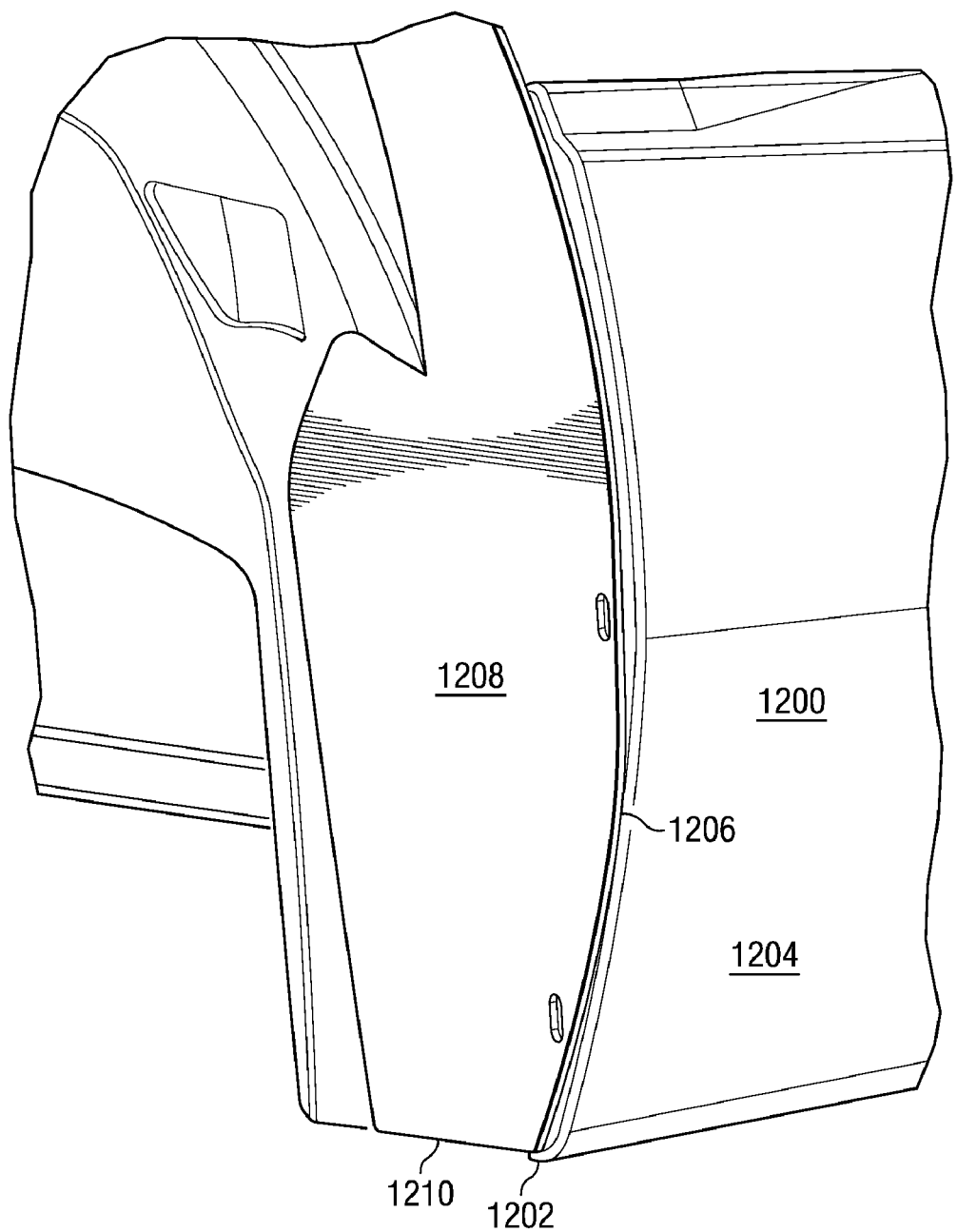
FIG. 12 is an isometric view of certain body components of a vehicle adjacent a wheel well thereof, taken from a forward and outboard direction.

FIG. 12 is an isometric view of certain vehicle body components adjacent to and partially defining a vehicle wheel well. An external body component 1200 can be formed out of metal and in the illustrated embodiment is substantially parallel to the axis of travel of the vehicle. Body component 1200 has a lower termination in a fender fold 1202, which extends in an inboard direction from an external surface 1204. Surface portion 1108 of the mud flap 1100 is custom-molded to the shape of external surface 1204. Fender fold 1202 will follow the transition of surface 1108 into shelf portion 1110, but will not extend far enough inboard to interfere with the operation of tab 1114.

The body component or fender 1200 terminates in a forward direction in a margin 1206, to which a wheel well liner 1208 is joined. The wheel well liner 1208 can be formed of various materials including steel, but in the illustrated embodiment is formed from plastic. Liner 1208 generally stands in a plane transverse to the axis of vehicle travel, or is formed as an arcuate surface generally around a wheel axle (not shown) to define the wheel well.

In the illustrated vehicle model, the liner 1208 terminates at its bottom in a free edge 1210; there is no fender fold terminating liner 1208. The edge runs generally transversely from an inboard to an outboard direction and is substantially horizontal. Near edge 1210, liner 1208 is substantially vertical. Where a wheel well-forming component has these two characteristics, a mud flap 1100 according to this embodiment of the invention may be used.

Figure 13:
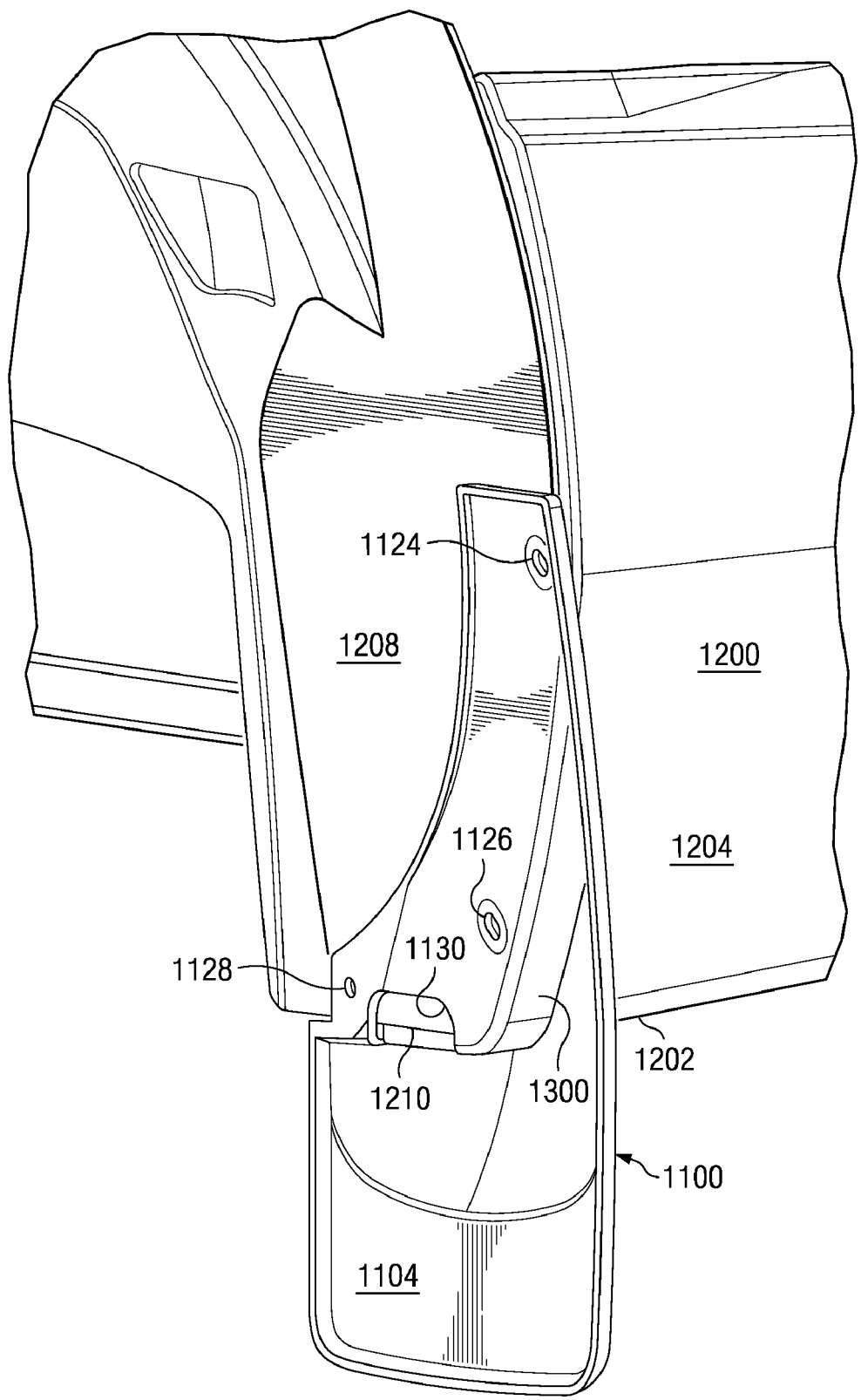
FIG. 13 is an isometric view taken from the viewpoint of FIG. 12, but showing the mud flap of FIG. 11A-B installed.

FIG. 13 shows the rear wheel well region of the vehicle shown in FIG. 12, but with mud flap 1100 installed in place. A front mud flap surface 1300 takes its shape from rear surface 1108 and it can be seen that this shape conforms to the downwardly and inwardly curving external body component surface 1204. The mud flap 1100 has been inserted upward along liner 1208 such that the downwardly depending liner edge 1210 has been captured between the tab (See FIGS. 11A, 14) and the rest of the mud flap body 1104. This view also shows how bolt holes 1124 and 1126 and the tab are not linear but form points on a plane, creating a more sure affixation of the mud flap 1100 to the vehicle.

Figure 14:
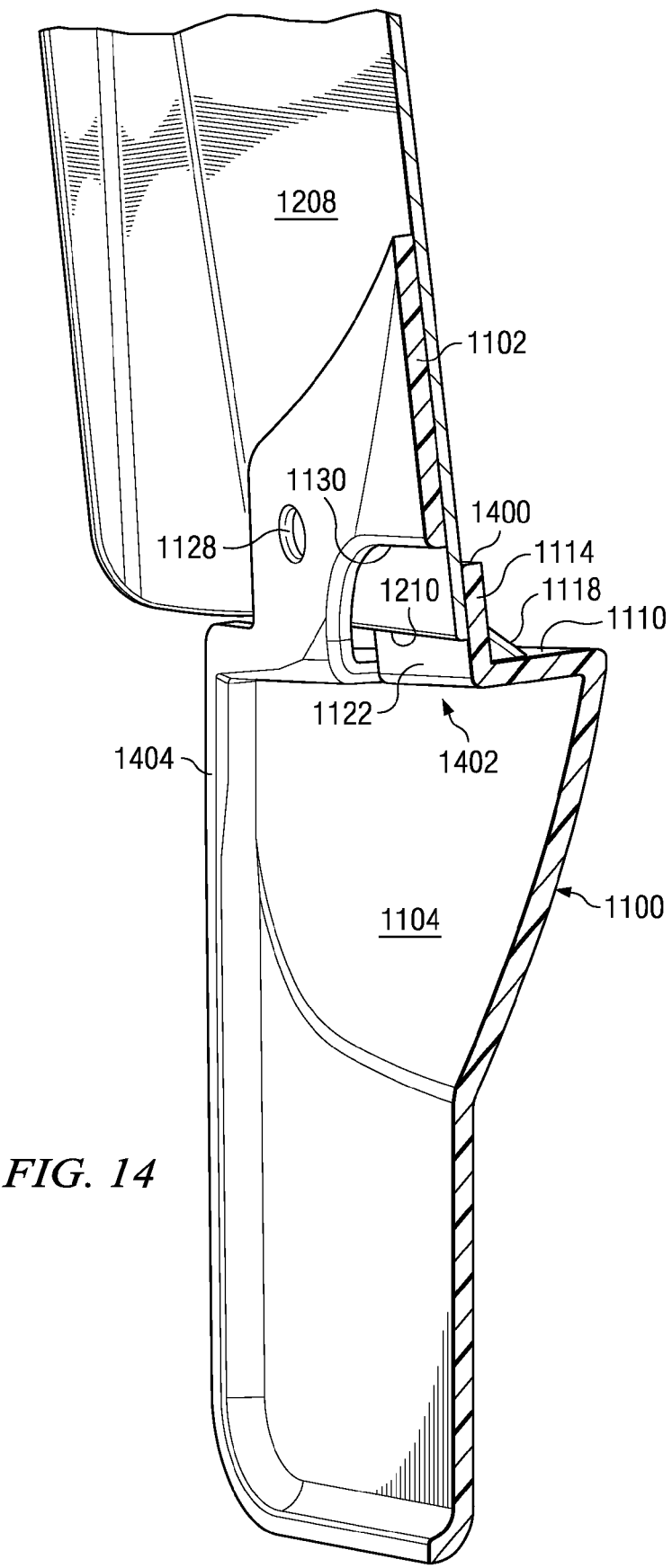
FIG. 14 is a cross-sectional detail taken substantially along line 14-14 of FIG. 11A.

FIG. 14 is a close-up sectional view taken through the tab 1114 and the liner 1208. The tab 1114 preferably terminates at its upper end with a surface 1400, curved or beveled in a frontward (leftward) and downward direction, so as to aid in the insertion of liner edge 1210 into a channel 1402 created by the frontward surface of tab 1114 and the general rear surface 1102 of the mud flap body 1104. The horizontal shelf portion 1110 provides a convenient sidewall from which tab 1114 may upwardly extend; the shelf portion 1110 acts to join tab 1114 to the rest of mud flap body 1104. Edge 1210 will typically not bottom out on the shelf portion 1110; the space between them will vary between one particular vehicle to the next (even of the same model) and therefore a tolerance is designed in so that mud flap 1100 will fit virtually all instances of this particular make and model.

Where, as here, the liner 1208 to which the tab 1114 is designed to attach is made of plastic, it is preferred that tab 1114 be a relatively extensive structure (as shown) because a plastic liner 1208 will not be as structurally strong as a similar steel or other metal body panel. Here, the width of tab 1114 in a transverse direction is chosen to occupy a large portion (such as at least half) of the distance between the inboard end of the fender fold 1202 and the inboard limit 1404 of the mud flap 1100. A height of the tab 1114 is selected to firmly capture liner edge 1210 in virtually all vehicles of this particular make and model, even where the height of the edge 1210 may vary from one vehicle to the next.

While the body element captured by tab 1114 happens to be a wheel liner in the illustrated embodiment, the mud flap according to this embodiment of the invention can attach to any vehicle wheel well having, as a wheel well-forming component, a component terminating in a downwardly depending free edge which can be captured by the upwardly open channel formed by general rear surface 1102 and tab 1114.

In summary, a mud flap equipped with a tab for capturing a free edge of a wheel liner has been shown and illustrated which obviates the need for drilling new holes in OEM body components.

While certain embodiments of the present invention have been described above and illustrated in the appended drawings, the present invention is not limited thereto but only by the scope and spirit of the appended claims.

I claim:

1. A mud flap for attachment to at least one vehicle wheel well body element making up a vehicle wheel well, the body element terminating in a free downwardly depending edge, the mud flap comprising:
    a mud flap body having a front face facing in a direction of vehicle travel and a general rear face opposed to the front face, the rear face adapted to be positioned forwardly of a rear surface of a vehicle wheel well;
    an upstanding tab integrally formed with the mud flap body, the tab having a forward surface substantially parallel to and rearwardly displaced from the general rear face of the mud flap body to define a body element channel therebetween, the tab connected to the mud flap body by at least one sidewall which is positioned at or below the downwardly depending edge of the body element;
    wherein the mud flap body includes a ledge which projects rearwardly from said general rear face of the mud flap body, an outboard portion of the ledge adapted to conform to an external surface of the vehicle, an inboard portion of the ledge being continuous with the outboard portion thereof and presenting a substantially horizontal upper surface, the tab extending upward from the inboard portion of the ledge, the ledge forming said at least one sidewall connecting the tab to the mud flap body.

2. The mud flap of claim 1, and further including at least one reinforcing gusset formed at an angle to, and extending between, said at least one sidewall and the tab.

3. The mud flap of claim 1, wherein the tab has at least one free edge opposed to said at least one sidewall, the free edge being curved or beveled toward the general rear face of the body to more easily permit the body element edge to be inserted into the channel.

4. A mud flap for attachment to at least one vehicle wheel well body element making up a vehicle wheel well, the body element terminating in a free downwardly depending edge, the mud flap comprising:
    a mud flap body having a front face facing in a direction of vehicle travel and a general rear face opposed to the front face, the rear face adapted to be positioned forwardly of a rear surface of a vehicle wheel well;
    an upstanding tab integrally formed with the mud flap body, the tab having a forward surface substantially parallel to and rearwardly displaced from the general rear face of the mud flap body to define a body element channel therebetween, the tab connected to the mud flap body by at least one sidewall which is positioned at or below the downwardly depending edge of the body element;
    wherein a window is formed in the mud flap body adjacent the tab, such that an installer positioned forwardly of the mud flap body can see the capturing of the downwardly depending edge of the vehicle wheel well body element through the window when the mud flap is correctly installed on the vehicle.

5. The mud flap of claim 4, wherein the body of the mud flap is further provided with a plurality of mounting screw holes extending from the front face of the body to the rear face thereof, the screw holes spaced apart from each other and from the tab in a noncolinear arrangement.

6. The mud flap of claim 4, wherein the mud flap body is injection-molded and is formed from a thermoplastic polymer.

* * * * *